United States Patent
Celik et al.

(10) Patent No.: US 7,487,486 B2
(45) Date of Patent: Feb. 3, 2009

(54) DEFINING STATISTICAL SENSITIVITY FOR TIMING OPTIMIZATION OF LOGIC CIRCUITS WITH LARGE-SCALE PROCESS AND ENVIRONMENTAL VARIATIONS

(76) Inventors: Mustafa Celik, 1153 Loyola Dr., Santa Clara, CA (US) 95051; Jiayong Le, 1047 Rich Ave., Apt. 6, Mountain View, CA (US) 94040; Lawrence Pileggi, 357 Dorseyville Rd., Pittsburgh, PA (US) 15215; Xin Li, 5600 5th Ave., Apt. D110, Pittsburgh, PA (US) 15232

(*) Notice: Subject to any disclaimer, the term of this patent is extended or adjusted under 35 U.S.C. 154(b) by 91 days.

(21) Appl. No.: 11/629,445

(22) PCT Filed: Jun. 11, 2005

(86) PCT No.: PCT/US2005/020838
§ 371 (c)(1),
(2), (4) Date: Dec. 13, 2006

(87) PCT Pub. No.: WO2006/009671
PCT Pub. Date: Jan. 26, 2006

(65) Prior Publication Data
US 2008/0072198 A1    Mar. 20, 2008

Related U.S. Application Data

(60) Provisional application No. 60/580,479, filed on Jun. 17, 2004.

(51) Int. Cl.
*G06F 17/50* (2006.01)
*G06F 7/60* (2006.01)
*G06F 7/52* (2006.01)

(52) U.S. Cl. ................ 716/6; 716/4; 716/5; 703/2; 708/607

(58) Field of Classification Search ............... 716/1–18
See application file for complete search history.

(56) References Cited

U.S. PATENT DOCUMENTS

| | | | |
|---|---|---|---|
| 2004/0243953 A1* | 12/2004 | Ramachandran et al. | 716/5 |
| 2004/0243954 A1* | 12/2004 | Devgan et al. | 716/6 |
| 2005/0066296 A1* | 3/2005 | Visweswariah | 716/6 |
| 2005/0091298 A1* | 4/2005 | Kalafala et al. | 708/607 |

* cited by examiner

*Primary Examiner*—Vuthe Siek
*Assistant Examiner*—Aric Lin
(74) *Attorney, Agent, or Firm*—Deborah Neville

(57) ABSTRACT

The large-scale process and environmental variations for today's nano-scale ICs are requiring statistical approaches for timing analysis and optimization (1). Significant research has been recently focused on developing new statistical timing analysis algorithms (2), but often without consideration for how one should interpret the statistical timing results for optimization. The invention provides a sensitivity-based metric (2) to assess the criticality of each path and/or arc in the statistical timing graph (4). The statistical sensitivities for both paths and arcs are defined. It is shown that path sensitivity is equivalent to the probability that a path is critical, and arc sensitivity is equivalent to the probability that an arc sits on the critical path. An efficient algorithm with incremental analysis capability (2) is described for fast sensitivity computation that has a linear runtime complexity in circuit size. The efficacy of the proposed sensitivity analysis is demonstrated on both standard benchmark circuits and large industry examples.

8 Claims, 7 Drawing Sheets

Illustration of the incremental timing and sensitivity analysis

Atomic operation in static timing analysis

Slack distribution in statistical timing analysis

A simple timing graph

Illustration of the incremental timing and sensitivity analysis

Circuit schematic of a simple digital circuit

Slack and sensitivity wall

DEFINING STATISTICAL SENSITIVITY FOR TIMING OPTIMIZATION OF LOGIC CIRCUITS WITH LARGE-SCALE PROCESS AND ENVIRONMENTAL VARIATIONS

RELATED APPLICATIONS

This Application is related to Provisional Application 60/580479, filed Jun. 17, 2004, the entirety of which is incorporated by reference as if fully set forth herein, and priority is claimed from Jun. 17, 2004.

GOVERNMENT FUNDING

Not applicable.

BACKGROUND

As integrated circuit ("IC") technologies are scaled to finer feature sizes, it becomes increasingly difficult to control the relative process variations. The increasing fluctuations in manufacturing processes introduce uncertainties in circuit behavior, thereby significantly impacting the circuit performance and product yield. The problem is exacerbated by the increasing impact of environmental fluctuations, such as variations in temperature and voltage supply. Current design methodology needs a new paradigm to address the nano-scale manufacturing and design realities; specifically, how to consider large-scale variations at all levels of design hierarchy.

To consider large scale variations at all design hierarchy levels, various algorithms have been recently proposed for statistical timing analysis with consideration of large-scale variations. Current solutions fall into one of two broad categories: path-based approaches and block-based approaches. The path-based approaches can take into account the correlations from both path sharing and global parameters; however, the set of critical paths must be pre-selected based on their nominal delay values. See, for example, "Statistical timing analysis for intra-die process variations with spatial variations", Agarwal et al, IEEE/ACM ICCAD, pp. 900-907, 2003). In contrast, the block-based statistical timing analysis is more general, yet is limited by the variation modeling assumptions. In particular, it has been demonstrated that since many circuit delays can be accurately approximated as Normal distributions, the spatial correlations and re-convergent fan outs can be handled efficiently for a block-based timing analysis. (See, for example, "Statistical timing analysis considering spatial correlations using a single PERT-like traversal", H. Chang and S. Sapatnekar, IEEE/ACM ICCAD, pp. 621-625, 2003).

While these statistical timing analysis algorithms have been intensively studied, precisely how to interpret and utilize their results remains an open question. A critical need exists for a new methodology in the statistical domain for using timing analysis results to guide timing optimization, as well as to explore the tradeoff between performance, yield and cost.

In nominal timing analysis, critical path and slack are two important concepts that have been widely utilized for timing optimization, but the inclusion of large-scale process variations renders these concepts obsolete.

Firstly, the delay of each path is a random variable, instead of a deterministic value, in statistical timing analysis. As such, every path can be critical (i.e. have the maximal delay) with certain probability. Secondly, the slacks at all nodes are random variables that are statistically coupled. The overall timing performance is determined by the distributions of all these slacks, as well as their correlations. This implies that individual slack at a single node is not meaningful and cannot be utilized as a criterion to guide timing optimization. Therefore, the traditional critical path and slack definitions are no longer valid. What is needed is a method for optimizing timing in integrated circuits at or near the nano-scale where such a method accommodates that large scale process and environmental variations.

SUMMARY

The invention taught herein provides a method for applying statistical sensitivity in guiding timing optimization of logic circuits with large-scale parameter variations. The inventive approach applies statistical sensitivities for both paths and arcs. As used herein, path sensitivity provides a framework from which to study and analyze timing constraints under process variations. Further, arc sensitivity provides an efficient metric to assess the criticality of each arc in the timing graph, where such assessment of criticality is useful for timing optimization.

The invention provides a link between probability and sensitivity. We prove that the path sensitivity is exactly equal to the probability that a path is critical, and the arc sensitivity is exactly equal to the probability that an arc sits on the critical path.

The invention provides significant improvements in statistical timing analysis. Firstly, unlike the criticality computation in Visweswariah et al, "First-order incremental block-based statistical timing analysis", IEEE/ACM DAC, pp. 331-336, 2004, where independence is assumed between the criticality probabilities of two paths, the inventive sensitivity-based measure is not restricted to such an independence assumption. Secondly, from the computation point of view, the sensitivities can be evaluated much more efficiently than the probabilities in large-scale circuits. The invention provides a novel algorithm for fast sensitivity computation, and enables evaluation of the sensitivities between the maximal circuit delay and all arc delays by a single breadth-first graph traversal. The computational complexity of the inventive sensitivity analysis algorithm is linear in circuit size. In addition, an incremental analysis capability is also provided to quickly update the statistical timing and sensitivity information after changes to a circuit are made.

DETAILED DESCRIPTION OF THE PREFERRED EMBODIMENT

Content Overview. The following section reviews the background for static timing analysis. Section 2 discusses the concepts of slack and critical path in statistical timing analysis. Section 3 teaches the inventive underpinnings of statistical sensitivity in section 3. Section 4 develops the inventive algorithm for sensitivity computation. Section 5 provides examples of application of the invention, illustrating the efficacy of sensitivity analysis.

1. Background 1.1 Nominal Static Timing Analysis

Figure 1:
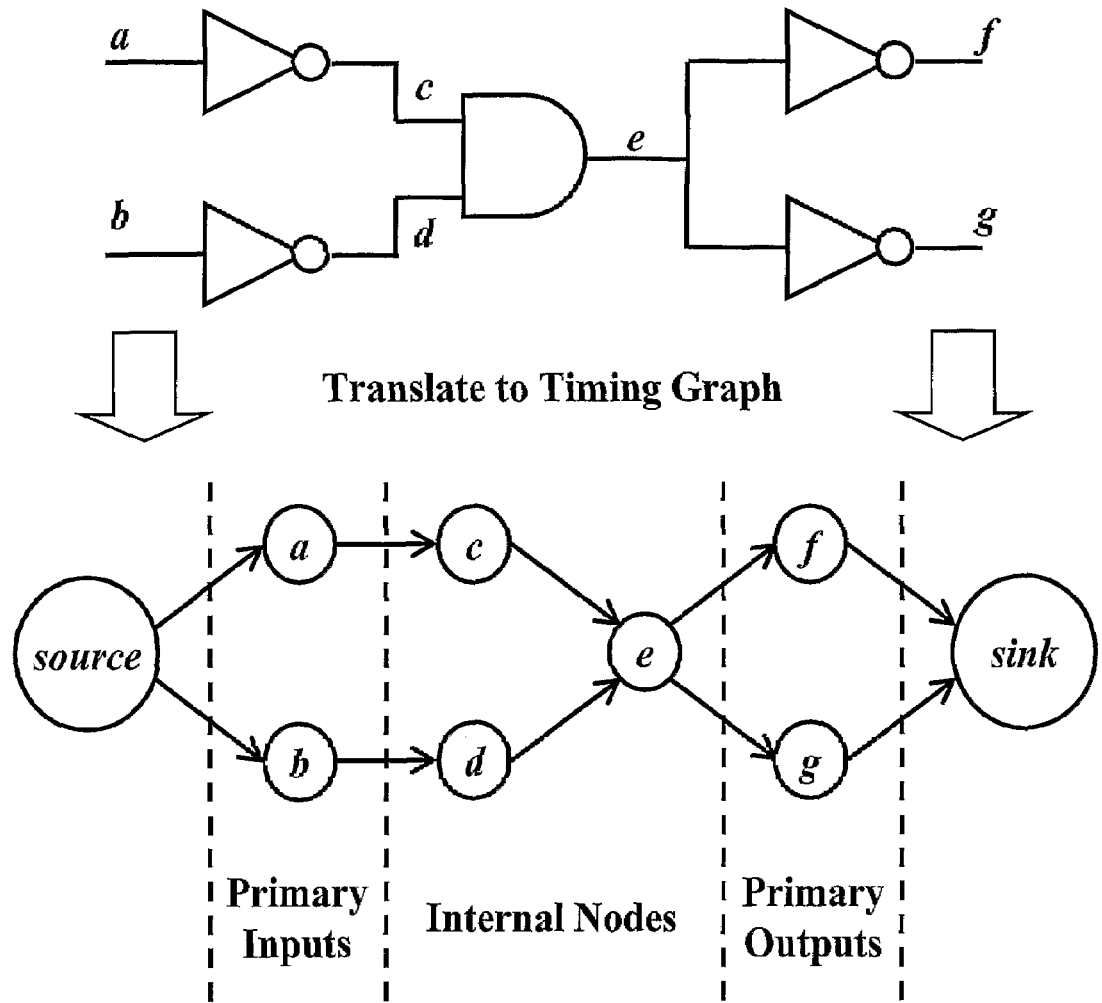
FIG. 1 depicts a timing graph example.

Given a circuit netlist, static timing analysis translates the netlist into a timing graph, i.e. a weighted directed graph G=(V,E) where each node Vi ∈ V denotes a primary input, output or internal net, each edge Ei=<Vm,Vn>∈ E denotes a timing arc, and the weight D(Vm,Vn) of Ei stands for the delay value from the node Vm to the node Vn. [Note: For simplicity, we use delay propagation to illustrate the basic concept of timing analysis. All concepts herein may likewise be applied to slope propagation]. In addition, a source/sink node is conceptually added before/after the primary inputs/outputs so that the timing graph can be analyzed as a single-input single-output network. FIG. 1 shows a typical example of the timing graph structure.

Several key concepts in nominal static timing analysis are briefly summarized below. (It should be noted that while only latest arrival time and required time are discussed, all concepts can likewise be applied to earliest arrival time and required time).

The arrival time (AT) at a node $V_i$ is the latest time that the signal becomes stable at $V_i$. It is determined by the longest path from the source node to $V_i$.

The required time (RT) at a node $V_i$ is the latest time that the signal is allowed to become stable at $V_i$. It is determined by the longest path from $V_i$ to the sink node.

Slack is the difference between the required time and arrival time, i.e. RT−AT. Therefore, positive slack means that the timing constraint is satisfied, while negative slack means that the timing constraint is failed.

Critical path is the longest path between the source node and the sink node. In nominal timing analysis, all nodes along the critical path have the same (smallest) slack.

Figure 2:
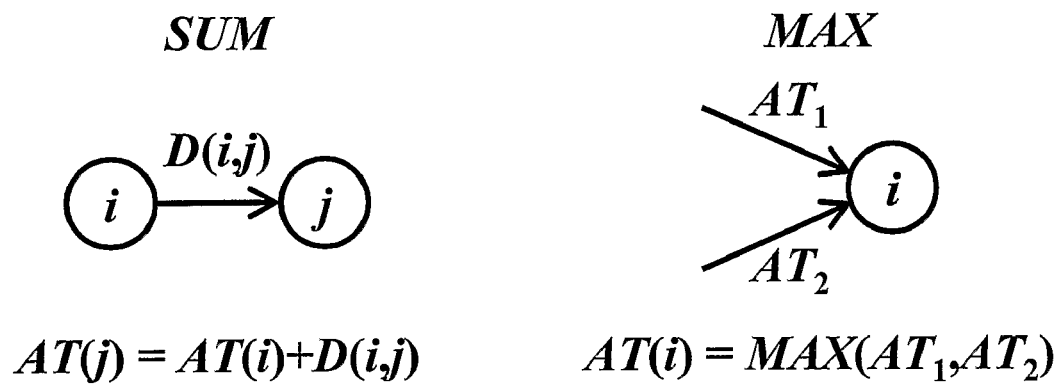
FIG. 2 depicts atomic operation in static timing analysis.

The purpose of nominal static timing analysis is to compute the arrival time, required time and slack at each node and to then identify the critical path. Taking the arrival time as an example, static timing analysis starts from the source node, propagates the arrival times through each timing arc by a breadth-first traversal, and eventually reaches the sink node. Two atomic operations, i.e. SUM and MAX as shown in FIG. 2, are repeatedly applied during such a traversal.

After the nominal static timing analysis is completed, the critical path and slack provide the information that is needed for timing optimization. Roughly speaking, the gates and interconnects along the critical path (where the slacks are small) can be up-sized in order to improve circuit speed, while those along the non-critical paths (where the slacks are large) can be down-sized to save chip area or power consumption. Of course, there are more subtle implications with up/down-sizing gates that can be shown as counter-examples to this over-simplification of the problem. For example, the increase in gate capacitance with upsizing creates a larger delay increase on the upstream logic stage, than the improvement in delay due to increasing the drive strength of the logic stage that is resized. Such cases are readily handled with accurate delay models and proper sensitivity information.

1.2 Statistical Timing Analysis

Compared with nominal timing analysis, the gate/interconnect delays in statistical timing analysis are all modeled as random variables to account for the inter-die and intra-die process variations. That means, the weight $D(V_m,V_n)$ associated with each timing arc is a random variable, instead of a deterministic value. In addition, it has been demonstrated, (see, for example, Agarwal et al IBID) that the gate/interconnect delays and arrival times for many digital circuits can be accurately approximated as Normal distributions without incurring substantial errors.

2.0 Statistics of Slack and Critical Path 2.1 Slack

The differences between nominal and statistical timing analysis are now discussed. We provide details as to why traditional concepts of slack and critical path become ineffective under process variations.

Figure 3:
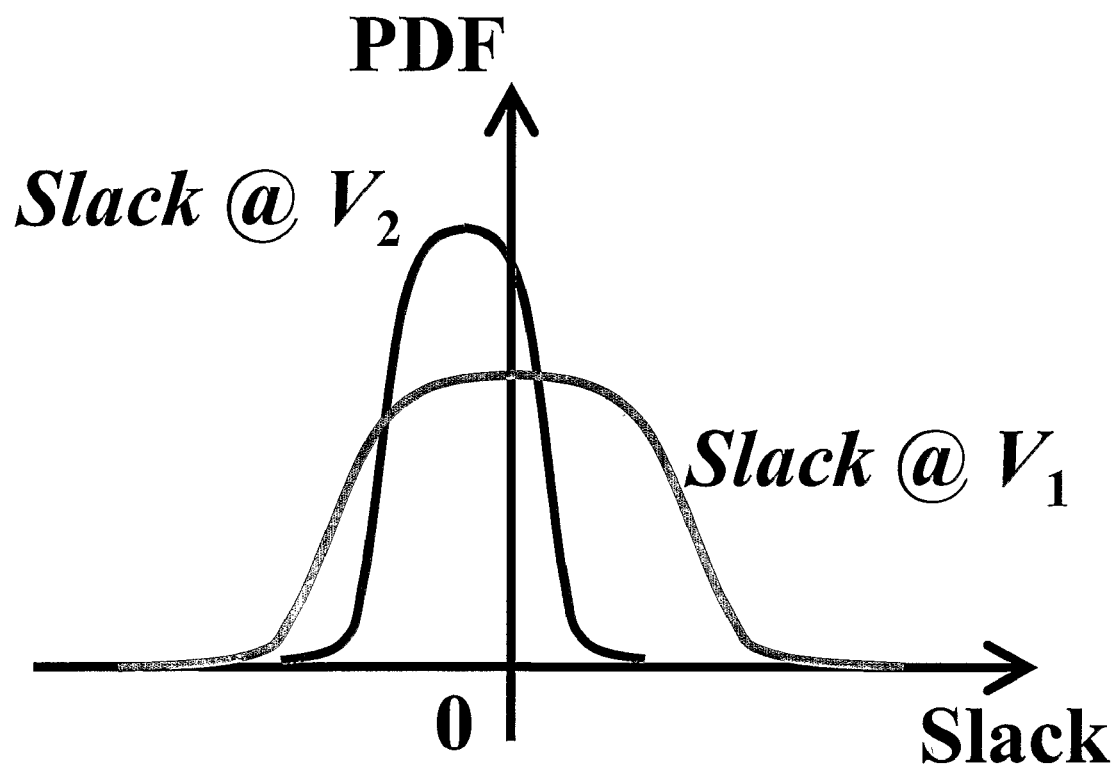
FIG. 3 depicts stack distribution in statistical timing analysis.

In nominal timing analysis, slack is utilized as a metric to measure how tightly the timing constraint is satisfied. A negative slack means that the timing constraint has not been met, while a (small) positive slack means that the timing constraint has been (marginally) satisfied. In statistical cases, however, it is difficult to make such a straightforward judgment, since all slacks are random variables instead of deterministic values. For instance, FIG. 3 shows two slack distributions computed from statistical timing analysis. The node $V_1$ presents a larger probability that the slack is positive than the node $V_2$. However, the worst-case (smallest) slack at $V_1$ is more negative than that at $V_2$. In this case, it is hard to conclude which slack distribution is better using a simple criterion.

More importantly, however, the slacks throughout the timing graph are statistically coupled in statistical timing analysis and must be considered concurrently to determine the timing performance. In nominal timing analysis, it is well-known that the timing constraint is satisfied if and only if all slacks in the timing graph are positive. In statistical cases, this condition can be stated as follows: the probability that the timing constraint is satisfied is equal to the probability that all slacks are positive:

$$P(\text{Satisfy Timing Constraint}) = P\begin{bmatrix} \text{Slack}(V_1) \geq 0 \ \& \\ \text{Slack}(V_2) \geq 0 \ \cdots \end{bmatrix} \quad (1)$$

Studying (1), one would find that such a probability is dependent on all slack distributions, as well as their correlations. Unlike the nominal timing analysis where slacks are deterministic values without correlations, knowing individual slack distributions in statistical timing analysis is still insufficient to assess the timing performance. The probability in (1) cannot be accurately evaluated if the slack correlations are ignored. The above analysis implies an important fact that an individual slack distribution at one node might not be meaningful in statistical timing analysis.

However, it should be noted that there are some "important" nodes in the timing graph with slacks that have special meaning. Given a timing graph, we define a node $V_{IN}$ as an important node if all paths in the timing graph pass $V_{IN}$. Based on this definition, the source node and sink node are two important nodes in any timing graph, since all paths start from the source node and terminate at the sink node. In some special timing graphs, it is possible to find other important nodes. For example, the node e in the timing graph FIG. 1 is also an important node by this definition. The importance of the node is that, if $V_{IN}$ is an important node, the probability in (1) can be uniquely determined by the slack at $V_{IN}$:

$$P(\text{Satisfy Timing Constraint})=P[\text{Slack}(V_{IN})\geq 0] \quad (2)$$

The physical meaning of (2) can be intuitively illustrated by the concept of Monte Carlo simulation. When a timing graph is simulated by Monte Carlo analysis, a delay sample (i.e. a set of deterministic delay values for all timing arcs) is drawn from the random variable space in each Monte Carlo run. The probability P(Satisfy Timing Constraint) is equal to $Num_1$ (the number of the samples for which the timing constraint is satisfied) divided by Num (the total number of the Monte Carlo runs). Similarly, the probability Slack($V_{IN}$)≧0 is equal to $Num_2$ (the number of the samples for which the slack at $V_{IN}$ is positive) divided by Num. In each Monte Carlo run, the timing constraint is failed if and only if there is a path P whose delay is larger than the specification. In this case, the slack at $V_{IN}$ must be negative since all paths pass the important node $V_{IN}$ and, therefore, $V_{IN}$ must be on the path P. The above analysis implies that $Num_1$ is equal to $Num_2$, yielding the equation in (2).

Equations (1) and (2) indicate another difference between nominal and statistical timing analysis. In nominal timing analysis, the slack at any node along the critical path uniquely determines the timing performance. In statistical timing analysis, however, only the slack at an important node uniquely determines the timing performance. Compared with the critical path nodes in nominal timing analysis, important nodes belong to a much smaller subset, since they must be included in all paths in the timing graph.

Following (2), it is sufficient to check the slacks only for important nodes, e.g. the source node or sink node. Therefore, using the concept of important node simplifies the timing verification procedure. This conclusion is also consistent with our intuition: the timing performance is determined by the maximal delay from the source node to the sink node. Therefore, the slacks at these two nodes are of the most interest for timing verification.

2.2 Critical Path

Similar to slack, there are key differences between nominal and statistical timing analysis on critical path. Firstly, given a timing graph, the maximal delay from the source node to the sink node can be expressed as:

$$D = \text{MAX}(D_{P_1}, D_{P_2}, \ldots) \quad (3)$$

where $D_{P_i}$ is the delay of the i-th path. In nominal timing analysis, $D = D_{P_i}$ if and only if the path $P_i$ is the critical path. In statistical timing analysis, however, every path can be critical (i.e. have the maximal delay) with certain probability. Although it is possible to define the most critical path as the path $P_i$ that has the largest probability to be critical, the maximal circuit delay in (3) must be determined by all paths, instead of the most critical path only.

Secondly, the most critical path is difficult to identify in statistical timing analysis. In nominal timing analysis, the critical path can be identified using slack since all nodes along the critical path have the same (smallest) slack. In statistical timing analysis, however, this property is no longer valid and all slacks are random variables.

Finally, but most importantly, the critical path concept is not so helpful for statistical timing optimization. In nominal cases, the gates and interconnects along the critical (non-critical) path are repeatedly selected for up (down) sizing. This strategy becomes ineffective under process variations. One important reason is that many paths might have similar probabilities to be critical and all these paths must be selected for timing optimization. Even in nominal cases, many paths in a timing graph can be equally critical, which is so-called "slack wall" as presented in Bai et al, "Uncertainty-aware circuit Optimization", IEEE/ACM DAC pp 58-63, 2002. This multiple-critical-path problem is more pronounced in statistical timing analysis, since more paths can have overlapped delay distributions due to large-scale process variations. In addition to this multiple-critical-path problem, we will demonstrate in Section 4 that selecting the gates and interconnects along the most critical (least critical) path for up (down) sizing might not be the best choices under a statistical modeling assumption.

3.0 Concept of Statistical Sensitivity

We define the concepts of path sensitivity and arc sensitivity for circuit optimization.

3.1 Path Sensitivity

In nominal timing analysis, the critical path is of great interest since it uniquely determines the maximal circuit delay. If the delay of the critical path is increased (decreased) by a small perturbation ∈, the maximal circuit delay is increased (decreased) by ∈ correspondingly. Therefore, given the maximal circuit delay D in (3), the relation between D and the individual path delay $D_{P_i}$ can be mathematically represented as the path sensitivity:

$$S_{P_i}^{Path} = \frac{\partial D}{\partial D_{P_i}} = \begin{cases} 1 & (\text{If } P_i \text{ is critical}) \\ 0 & (\text{Otherwise}) \end{cases} \quad (4)$$

(For simplicity, we assume there is only one critical path which has the maximal delay in the nominal timing graph).

From the sensitivity point of view, a critical path is important since it has non-zero sensitivity and all other non-critical paths have zero sensitivity. The maximal circuit delay can be changed if and only if the critical path delay is changed. This is the underlying reason why the critical path is important for timing optimization. It is the sensitivity, instead of the critical path itself, that provides an important criterion to guide timing optimization. A path is more (less) important if it has a larger (smaller) path sensitivity.

In statistical timing analysis, all path delays are random variables. Although directly computing sensitivity between two random variables seems infeasible, the path sensitivity can be defined by their expected values (i.e. moments). One simple definition for path sensitivity is to use the first order moment, i.e.:

$$S_{P_i}^{Path} = \frac{\partial E(D)}{\partial E(D_{P_i})} \quad (5)$$

where E(●) stands for the expected value operator. The path sensitivity in (5) models the mean value relation between the maximal circuit delay D and the individual path delay $D_{P_i}$. It should be noted, however, the path sensitivity can also be defined for the second order moments or even higher order moments. For example, it is possible to define the path sensitivity as:

$$S_{P_i}^{Path} = \frac{\partial VAR(D)}{\partial E(D_{P_i})} \quad (6)$$

where VAR(●) stands for the variance of a random variable. The path sensitivity in (6) provides a quantitative value to link the variance of the maximal circuit delay D to the mean of an individual path delay $D_{P_i}$. Herein, we focus on the path sensitivity in (5) which has several important properties.

Theorem 1: The path sensitivity in (5) satisfies:

$$\sum_i S_{Pi}^{Path} = 1 \qquad (7)$$

Proof: Given a small perturbation $\in \to 0$ on the mean values of all paths, the mean value of the maximal circuit delay is:

$$E[\text{MAX}(D_{P1}+\in, D_{P2}+\in, \ldots)] = E[\text{MAX}(D_{P1}, D_{P2}, \ldots)] + \in \qquad (8)$$

According to the path sensitivity definition in (5), the mean value of the maximal circuit delay can also be represented by:

$$E[\text{MAX}(D_{P1}+\varepsilon, D_{P2}+\varepsilon, \ldots)] = \qquad (9)$$
$$E[\text{MAX}(D_{P1}, D_{P2}, \ldots)] + \sum_i \varepsilon \cdot S_{Pi}^{Path}$$

Comparing (8) and (9) yields the result in (7).

Theorem 2: Give the maximal circuit delay $D = \text{MAX}(D_{P1}, D_{P2}, \ldots)$ where $D_{Pi}$ is the delay of the i-th path, if the probability $P[D_{Pi} = \text{MAX}(D_{Pj}, j \neq i)]$ is equal to 0, then the path sensitivity in (5) is equal to the probability that the path $P_i$ is critical, i.e.:

$$S_{Pi}^{Path} = P(D_{pi} \geq D_{P1} \,\&\, D_{Pi} \geq D_{P2} \,\&\, \ldots) \qquad (10)$$

Proof: Let $A_{Pi} = \text{MAX}(D_{Pj}, j \neq i)$ and we have:

$$S_{Pi}^{Path} = \frac{\partial E[\text{MAX}(D_{Pi}, A_{Pi})]}{\partial E(D_{Pi})} \qquad (11)$$

$$P(D_{Pi} \geq D_{P1} \,\&\, D_{Pi} \geq D_{P2} \,\&\, \ldots) = P(D_{Pi} \geq A_{Pi}) \qquad (12)$$

Assume that $\text{pdf}(D_{Pi}, A_{Pi})$ is the joint probability distribution function for $D_{Pi}$ and $A_{Pi}$, yielding:

$$E[\text{MAX}(D_{Pi}, A_{Pi})] = \qquad (13)$$
$$\iint \text{MAX}(D_{Pi}, A_{Pi}) \cdot \text{pdf}(D_{Pi}, A_{Pi}) \cdot dD_{Pi} dA_{Pi} =$$
$$\iint \text{MAX}(D_{Pi} - A_{Pi}, 0) \cdot \text{pdf}(D_{Pi}, A_{Pi}) \cdot dD_{Pi} dA_{Pi} + E(A_{Pi})$$

The second term in (13) is independent on $E(D_{Pi})$ and its derivative to $E(D_{Pi})$ is equal to 0. Substituting (13) into (11) yields:

$$S_{Pi}^{Path} = \frac{\partial \left[\iint \text{MAX}(D_{Pi} - A_{Pi}, 0) \cdot \text{pdf}(D_{Pi}, A_{Pi}) \cdot dD_{Pi} dA_{Pi}\right]}{\partial E(D_{Pi})} \qquad (14)$$

Given a small perturbation $\in \to 0$ on the mean value of $D_{Pi}$, equation (14) yields:

$$S_{Pi}^{Path} = \qquad (15)$$
$$\iint \lim_{\varepsilon \to 0} \frac{1}{\varepsilon} \left[ \begin{array}{c} \text{MAX}(D_{Pi} - A_{Pi} + \varepsilon, 0) - \\ \text{MAX}(D_{Pi} - A_{Pi}, 0) \end{array} \right] \cdot \text{pdf}(D_{Pi}, A_{Pi}) \cdot dD_{Pi} dA_{Pi}$$

where $$\lim_{\varepsilon \to 0} \frac{1}{\varepsilon} \left[ \begin{array}{c} \text{MAX}(D_{Pi} - A_{Pi} + \varepsilon, 0) - \\ \text{MAX}(D_{Pi} - A_{Pi}, 0) \end{array} \right] = \begin{cases} 1 & (D_{Pi} > A_{Pi}) \\ 1 & (D_{Pi} = A_{Pi} \,\&\, \varepsilon > 0) \\ 0 & (D_{Pi} = A_{Pi} \,\&\, \varepsilon < 0) \\ 0 & (D_{Pi} < A_{Pi}) \end{cases} \qquad (16)$$

Therefore, given the assumption that the probability $P(D_{Pi} = A_{Pi})$ is 0, the following integration is also equal to 0.

$$\left| \iint_{D_{Pi} = A_{Pi}} \lim_{\varepsilon \to 0} \frac{1}{\varepsilon} \left[ \begin{array}{c} \text{MAX}(D_{Pi} - A_{Pi} + \varepsilon, 0) - \\ \text{MAX}(D_{Pi} - A_{Pi}, 0) \end{array} \right] \cdot \right. \qquad (17)$$
$$\left. \text{pdf}(D_{Pi}, A_{Pi}) \cdot dD_{Pi} dA_{Pi} \right| \leq$$
$$\iint_{D_{Pi} = A_{Pi}} \text{pdf}(D_{Pi}, A_{Pi}) \cdot dD_{Pi} \cdot dA_{Pi} = P(D_{Pi} = A_{Pi}) = 0$$

Substituting (16) and (17) into (15) yields:

$$S_{Pi}^{Path} = \iint_{D_{Pi} > A_{Pi}} \text{pdf}(D_{Pi}, A_{Pi}) \cdot dD_{Pi} \cdot dA_{Pi} \qquad (18)$$
$$= P(D_{Pi} > A_{Pi})$$
$$= P(D_{Pi} \geq A_{Pi})$$

In (18) $P(D_{Pi} \geq A_{Pi}) = P(D_{Pi} > A_{Pi})$, since $P(D_{Pi} = A_{Pi}) = 0$. Substituting (18) into (12) proves the result in (10).

Theorem 2 relies on the assumption $P[D_{Pi} = \text{MAX}(D_{Pj}, j \neq i)] = 0$. The physical meaning of this assumption can be further explained by the following theorem.

Theorem 3: Let $D_{Pi}$ be the delay of the $i$-th path. The probability $P[D_{Pi} = \text{MAX}(D_{Pj}, j \neq i)] = 0$ for any $\{i = 1, 2, \ldots\}$, if the probability $P(D_{Pi} = D_{Pj}) = 0$ for any $i \neq j$.

Proof: Based on the probability theorem (see *Probability, Random Variables and Stochastic Processes*, A. Papoulis, S. Pillai. McGraw Hill, 2001) we have:

$$P[D_{Pi} = \text{MAX}(D_{Pj}, j \neq i)] = \qquad (19)$$
$$\sum_{j \neq i} P[D_{Pi} = D_{Pj} \,\&\, D_{Pj} \geq \text{MAX}(D_{Pk}, k \neq i, k \neq j)] \leq$$
$$\sum_{j \neq i} P(D_{Pi} = D_{Pj}) = 0$$

Theorem 3 implies that the assumption in Theorem 2 is satisfied if any two paths in the circuit are not exactly identical. This is true in most practical applications where the intra-die variations are considered. Note that, even if two path delays have the same mean and variance values, they can still be statistically different. For example, two paths are located in different regions of the chip such that their delays depend on different intra-die variations.

3.2 Arc Sensitivity

In nominal timing optimization, the gates and interconnects along the critical path are important, since the maximal circuit delay is sensitive to these gate/interconnect delays. Following this reasoning, the importance of a given gate or interconnect can be assessed by the following arc sensitivity:

$$S_{Ai}^{Arc} = \frac{\partial D}{\partial D_{Ai}} = \sum_k S_{Pk}^{Path} \cdot \frac{\partial D_{Pk}}{\partial D_{Ai}} = \begin{cases} 1 & (A_i \text{ is on critical path}) \\ 0 & (\text{Otherwise}) \end{cases} \quad (20)$$

where $D$ is the maximal circuit delay given in (3), $D_{Ai}$ denotes the gate/interconnect delay associated with the i-th arc, and $D_{Pk}$ represents the delay of the k-th path. In (20), the path sensitivity $S_{Pk}^{Path}$ is non-zero (equal to 1) if and only if the k-th path $P_k$ is critical. In addition, the derivative $\partial D_{Pk}/\partial D_{Ai}$ is non-zero (equal to 1) if and only if the i-th arc $A_i$ sits on the k-th path $P_k$, since the path delay $D_{Pk}$ is equal to the sum of all arc delays $D_{Ai}$ that belong to this path. These observations yield the conclusion that the arc sensitivity $S_{Ai}^{Arc}$ is non-zero if and only if $A_i$ is on the critical path. The arc sensitivity explains why the gates and interconnects along the critical path are important for timing optimization. A gate/interconnect is more (less) important if it has a larger (smaller) arc sensitivity.

The aforementioned sensitivity concept can be extended to statistical timing analysis. In statistical cases, we define the arc sensitivity using the first order moments:

$$S_{Ai}^{Arc} = \frac{\partial E(D)}{\partial E(D_{Ai})} \quad (21)$$

Similar to path sensitivity, the arc sensitivity can also be defined by using high order moments. Herein, we focus on the arc sensitivity in (21) which has the following important property.

Theorem 4: Let $D_{Pi}$ be the delay of the i-th path. If the probability $P[D_{Pi} = MAX(D_{Pj}, j \neq i)] = 0$ for any $\{i = 1, 2, \ldots\}$, then the arc sensitivity in (21) is equal to:

$$S_{Ai}^{Arc} = \sum_{Ai \in Pk} S_{Pk}^{Path} \quad (22)$$

Proof: Assume that $pdf(D_{P1}, D_{P2}, \ldots)$ is the joint probability distribution function all path delays, yielding:

$$S_{Ai}^{Arc} = \frac{\partial \left[ \int MAX(D_{P1}, D_{P2}, \ldots) \cdot pdf(D_{P1}, D_{P2}, \ldots) \cdot dD_{P1} dD_{P2} \ldots \right]}{\partial E(D_{Ai})} \quad (23)$$

$$= \int \frac{\partial MAX(D_{P1}, D_{P2}, \ldots)}{\partial E(D_{Ai})} \cdot pdf(D_{P1}, D_{P2}, \ldots) \cdot dD_{P1} dD_{P2} \ldots$$

Theoretically, the MAX function in (23) is not differentiable at the locations where $D_{Pi}=MAX(D_{Pj}, j\neq i)$. However, as shown in (17), the integration in (23) is equal to 0 at these singular points, as long as $P[D_{Pi}=MAX(D_{Pj}, j\neq i)]=0$. Therefore, these singular points have no effect on the final value of $S_{Ai}^{Arc}$ and can be ignored.

$$S_{Ai}^{Arc} = \int \sum_k \frac{\partial MAX(D_{P1}, \ldots)}{\partial D_{Pk}} \cdot \frac{\partial D_{Pk}}{\partial E(D_{Ai})} \cdot pdf(D_{P1}, \ldots) \cdot dD_{P1} \ldots \quad (24)$$

$$= \int \sum_{Ai \in Pk} \frac{\partial MAX(D_{P1}, \ldots)}{\partial D_{Pk}} \cdot pdf(D_{P1}, \ldots) \cdot dD_{P1} \ldots$$

In (24), the derivative $\partial D_{Pk}/\partial E(D_{Ai})$ is non-zero (equal to 1) if and only if the i-th arc $A_i$ sits on the k-th path $P_k$. Comparing (24) and (5) yields the equation in (22).

Remember that $S_{Pk}^{Path}$ is equal to the probability that the k-th path $P_k$ is critical (Theorem 2). Therefore, the arc sensitivity defined in (21) is exactly equal to the probability that the arc sits on the critical path.

The arc sensitivity defined in (21) provides an effective criterion to select the most important gates and interconnects for up/down sizing. Once again roughly speaking, for statistical timing optimization, the gates and interconnects with large arc sensitivities are critical to the maximal circuit delay and in general can be up-sized to improve circuit speed, while the others with small arc sensitivities can be down-sized to save chip area and power consumption. Next, using the concept of arc sensitivity, we explain the reason why repeatedly selecting the gates and interconnects along the most critical (least critical) path for up (down) sizing can be ineffective in statistical cases.

Figure 4:
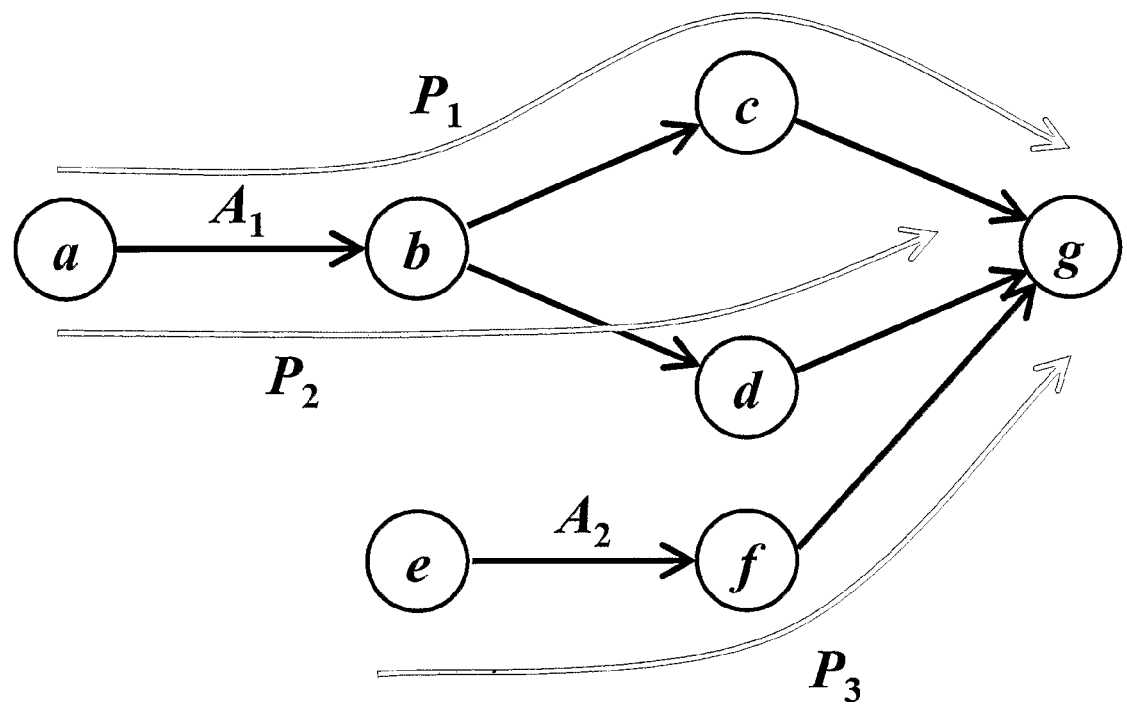
FIG. 4 shows a simple timing graph.

Consider a simple timing graph including three paths, as shown in FIG. 4. Assume that the path sensitivity $S_{P1}^{Path}=S_{P2}^{Path}=0.3$ and $S_{P3}^{Path}=0.4$. Therefore, $P_3$ is the most critical path since it has the largest path sensitivity and is most likely to have the maximal delay. Using the traditional concept of critical path, the arc $A_2$ should be selected for up-sizing in order to reduce the circuit delay. However, according to Theorem 4, it is easy to verify that $S_{A1}^{Arc}=S_{P1}^{Path}+S_{P2}^{Path}=0.6$ and $S_{A2}^{Arc}=S_{P3}^{Path}=0.4$. The arc $A_1$ has a more significant impact on the maximal circuit delay and should be selected for up-sizing, although it does not sit on the most critical path. In this example, using the traditional concept of critical path selects the wrong arc, since it does not consider the non-zero path sensitivities of other less critical paths. These non-zero sensitivities make it possible that changing an arc delay can change the maximal circuit delay through multiple paths. In FIG. 4, the arc $A_1$ can change the maximal circuit delay through two paths $P_1$ and $P_2$, while the arc $A_2$ can change the maximal circuit delay only through one path $P_3$. Therefore, the arc $A_1$ eventually becomes more critical than $A_2$, although neither $P_1$ nor $P_2$ is the most critical path.

In summary, two different sensitivities, i.e. path sensitivity and arc sensitivity, have been defined and described, and the theoretical links between probability and sensitivity have been shown. The sensitivity-based framework taught herein has three unique properties:

Distribution-independent. The aforementioned theoretical results for path sensitivity and arc sensitivity are independent on specific random distributions; e.g. the Normal distributions that are assumed in many statistical timing analysis algorithms.

Correlation-aware. The criticality computation (see Visweswariah et al. "First Order Incremental Block-Based Statistical Analysis" IEEE/ACM DAC pp. 621-625, 2003) assumes independence between the criticality probabilities of two paths, although their statistical timing analysis can handle correlated cases. The inventive sensitivity-based framework for criticality analysis is not restricted to the independence assumption.

Computation-efficient. Computing sensitivities is much more efficient than the direct probability computation.

4. Algorithm for Sensitivity Computation

The arc sensitivity values are useful to pick up the most critical arcs for timing optimization. The inventive method is discussed below.

We first develop the sensitivity equations for two atomic operations: SUM and MAX. Then, we show how to propagate the sensitivities throughout the timing graph, using a single breadth-first graph traversal. Finally, we discuss the incremental analysis algorithm to quickly update the sensitivity values after changes to a circuit are made.

The sensitivity analysis should be scheduled after the statistical timing analysis. Therefore, we assume that the timing analysis results are already available before the sensitivity analysis begins. In addition, we assume that the gate/interconnect delays and arrival times can be approximated as Normal distributions. Such a Normal distribution assumption facilitates an efficient sensitivity computation without incurring substantial errors. It should be noted, however, that nothing precludes us from including non-Normal distributions in the sensitivity analysis, since our sensitivity-based framework proposed in Section 3.1 is completely distribution-independent.

4.1 Atomic Operation

A key function in statistical timing analysis is to propagate arrival times through the gates. In order to do that, two atomic operations are required, i.e. SUM and MAX, as shown in FIG. 2. Since multi-variable operations can be easily broken down into multiple two-variable cases, the remainder of this section focuses on the sensitivity computation for SUM and MAX of two random variables, i.e. $z=x+y$ and $z=MAX(x,y)$ where:

$$x = x_0 + \sum_{i=1}^{M} x_i \eta_i \quad (25)$$

$$y = y_0 + \sum_{i=1}^{M} y_i \eta_i$$

$$z = z_0 + \sum_{i=1}^{M} z_i \eta_i$$

In (25), $\{x_0, y_0, z_0\}$ are the constant terms, $\{x_i, y_i, z_i, i=1, 2, \ldots, M\}$ are the linear coefficients, $\{\eta_i, i=1, 2, \ldots, M\}$ are a set of independent random variables with standard Normal distributions (i.e. zero mean and unit standard deviation), and M is the total number of these random variables. The independent random variables $\{\eta_i, i=1, 2, \ldots, M\}$ can be extracted by principle component analysis, (see G. Seber, *Multivariate Observations*, Wiley Series, 1984) even if the original process parameters are correlated. Such a delay model in (25) is also used in many other statistical timing analysis algorithms. See, e.g. Chang et al. "Statistical Timing Analysis Considering Spatial Correlations Using a Single PERT-like Traversal", IEEE ACM ICCAD, pp. 621-625, 2003; Visweswariah, ibid.

Given the operation $z=x+y$ or $z=MAX(x,y)$ where x, y and z are approximated as (25), we define the sensitivity matrix $Q_{z \leftarrow x}$ as:

$$Q_{z \leftarrow x} = \begin{bmatrix} \partial z_0/\partial x_0 & \partial z_0/\partial x_1 & \ldots & \partial z_0/\partial x_M \\ \partial z_1/\partial x_0 & \partial z_1/\partial x_1 & \ldots & \partial z_1/\partial x_M \\ \vdots & \vdots & \vdots & \vdots \\ \partial z_M/\partial x_0 & \partial z_M/\partial x_1 & \ldots & \partial z_M/\partial x_M \end{bmatrix} \quad (26)$$

The sensitivity matrix $Q_{z \leftarrow y}$ can be similarly defined.

The sensitivity matrix in (26) provides the quantitative information that how much the coefficients $\{z_i, i=0, 1, \ldots, M\}$ will be changed if there is a small perturbation on $\{x_i, i=0, 1, \ldots, M\}$. Next, we derive the mathematic formulas of the sensitivity matrices for both SUM and MAX operations.

For the SUM operation $z=x+y$, it is easy to verify that:

$$z_i = x_i + y_i (i=0, 1, \ldots, M) \quad (27)$$

Therefore, the sensitivity matrix $Q_{z \leftarrow x}$ is an identity matrix.

For the MAX operation $z=MAX(x,y)$, it has be proven that:

$$\partial z_0/\partial x_0 = \Phi(\alpha) \quad (28)$$

$$\partial z_0/\partial x_i = \partial z_i/\partial x_0 = \varphi(\alpha)(x_i - y_i)/\rho \quad (i = 1, 2, \ldots, M)$$

$$\partial z_i/\partial x_i = \Phi(\alpha) - \alpha\varphi(\alpha)(x_i - y_i)^2/\rho^2 \quad (i = 1, 2, \ldots, M)$$

$$\partial z_i/\partial x_j = -\alpha\varphi(\alpha)(x_i - y_i)(x_j - y_j)/\rho^2 \quad \begin{pmatrix} i, j = 1, 2, \ldots, M \\ i \neq j \end{pmatrix}$$

where $\phi(\bullet)$ and $\Phi(\bullet)$ are the probability density function and the cumulative distribution function of the standard Normal distribution respectively, and:

$$\rho = \sqrt{\sum_{i=1}^{M} (x_i - y_i)^2} \quad \alpha = (x_0 - y_0)/\rho \quad (29)$$

Equations (28) and (29) can be derived by directly following the mathematic formulations in C. Clark, The Greatest of a Set of Finite Variables," Operations Research, pp 45-162, March-April 1961. The detailed proof of these equations is omitted here owing to space considerations.

It is worth noting that the sensitivity matrix $Q_{z \leftarrow y}$ can be similarly computed using (27)-(29), since both the SUM and MAX operations are symmetric.

4.2 Sensitivity Propagation

Once the atomic operations are available, they can be applied to propagate the sensitivity matrices throughout the timing graph. Next, we use the simple timing graph in FIG. 1 as an example to illustrate the key idea of sensitivity propagating. In such an example, propagating the sensitivity matrices can be achieved through the following steps.

Start from the MAX operation at the sink node, i.e. $D=MAX[AT(g)+D(f,sink), AT(g)+D(g,sink)]$ where D denotes the arrival time at the sink node (i.e. the maximal circuit delay), AT(i) represents the arrival time at the node i and D(i,j) stands for the delay of the arc <i,j>. Compute the sensitivity matrices $Q_{D \leftarrow [AT(f)+D(f,sink)]}$ and $Q_{D \leftarrow [AT(g)+D(g,sink)]}$ using (28)-(29).

Propagate $Q_{D \leftarrow [AT(f)+D(f,sink)]}$ to the node f through the arc <f,sink>. Based on the chain rule of the derivatives, $Q_{D \leftarrow AT(f)} = Q_{D \leftarrow [AT(f)+D(f,sink)]} \cdot Q_{[AT(f)+D(f,sink)] \leftarrow AT(f)}$ and
$Q_{D \leftarrow D(f,sink)} = Q_{D \leftarrow [AT(f)+D(f,sink)]}$.
$Q_{[AT(f)+D(f,sink)] \leftarrow (f,sink)} \cdot Q_{[AT(f)+D(f,sink)] \leftarrow AT(f)}$ and $Q_{[AT(f)+D(f,sink)] \leftarrow D(f,sink)}$ are the identity matrices due to the SUM operation.

Similarly propagate $Q_{D \leftarrow [AT(g)+D(g,sink)]}$ to the node g through the arc <g,sink>. Determine $Q_{D \leftarrow AT(g)}$ and $Q_{D \leftarrow D(g,sink)}$.

Propagate $Q_{D \leftarrow AT(f)}$ and $Q_{D \leftarrow AT(g)}$ to the node e, yielding $Q_{D \leftarrow D(e,f)} = Q_{D \leftarrow AT(f)}$, $Q_{D \leftarrow D(e,g)} = Q_{D \leftarrow AT(g)}$ and $Q_{D \leftarrow AT(e)} = Q_{D \leftarrow AT(f)} + Q_{D \leftarrow AT(g)}$. Note that the out-degree of the node e is equal to two. Therefore, the sensitivity matrices $Q_{D \leftarrow AT(f)}$ and $Q_{D \leftarrow AT(g)}$ should be added together at the node e to compute $Q_{D \leftarrow AT(e)}$. Its physical meaning is that a small perturbation on AT(e) can change the maximal circuit delay D through two different paths {e→f→sink} and {e→g→sink}.

Continue propagating the sensitivity matrices until the source node is reached.

In general, the sensitivity propagation involves a single breath-first graph traversal from the sink node to the source node with successive matrix multiplications. The computationally complexity of such a sensitivity propagation is linear in circuit size. After the sensitivity propagating, the sensitivity matrix $Q_{D \leftarrow D(i,j)}$ between the maximal circuit delay D and each arc delay D(i,j) is determined. Based on these sensitivity matrices, the arc sensitivity can be easily computed by a quick post-processing. For example, the arc sensitivity defined in (21) is the (1,1)-th element in $Q_{D \leftarrow D(i,j)}$ (see the sensitivity matrix definition in (26)), i.e.:

$$S_{<i,j>}^{Arc} = [1\ 0\ \ldots\ ] \cdot Q_{D \leftarrow D(i,j)} \cdot [1\ 0\ \ldots\ ]^T \quad (30)$$

4.3 Incremental Sensitivity Analysis

Figure 5:
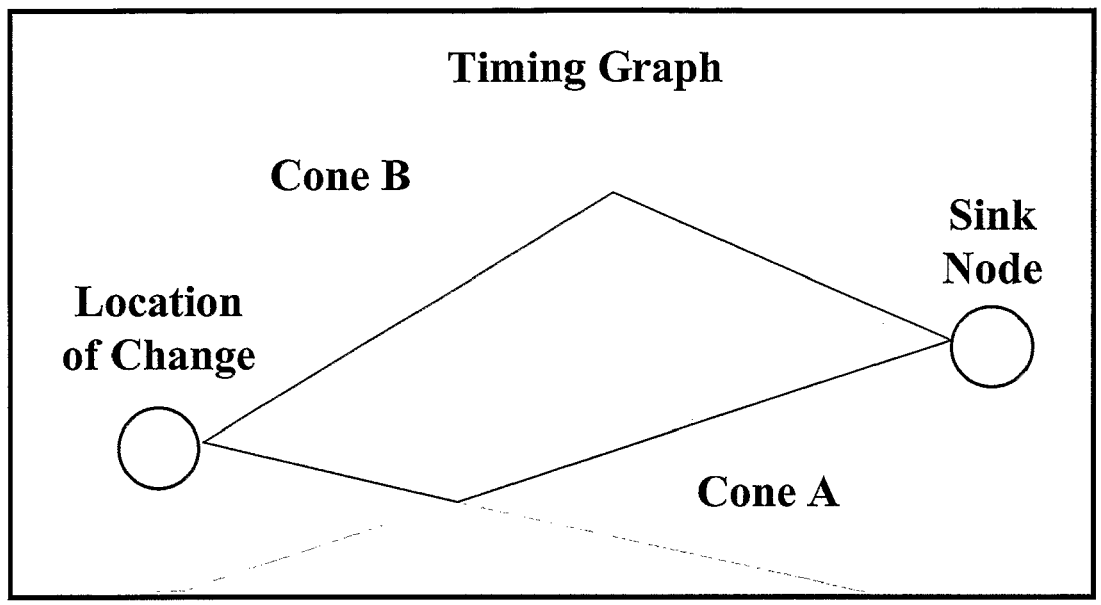
FIG. 5 illustrates incremental timing and sensitivity analysis.

The incremental analysis capability facilitates a quick update on statistical timing and sensitivity information after local changes to a circuit are made. The complete statistical timing and sensitivity analysis consists of one forward arrival time propagation from the source node to the sink node and one backward sensitivity propagation from the sink node to the source node. If a change is made as shown in FIG. 5, both the arrival time values in the cone A and the sensitivity values in the cone B (see FIG. 5) should be updated. Such an incremental update scheme is similar to that of the nominal timing analysis, although the detailed implementations can be quite different. For example, in our incremental sensitivity analysis, special data structures are required for efficiently propagating the sensitivity matrices.

5. Numerical Examples

We demonstrate the efficacy of the proposed sensitivity analysis using several circuit examples. All circuits are implemented in a standard CMOS 0.13 μm process. The inter-die and intra-die variations on $V_{TH}$, $T_{OX}$, W and L are considered. All numerical simulations are executed on an Intel Pentium 2.6 GHz computer with 1 GB memory.

Figure 6:
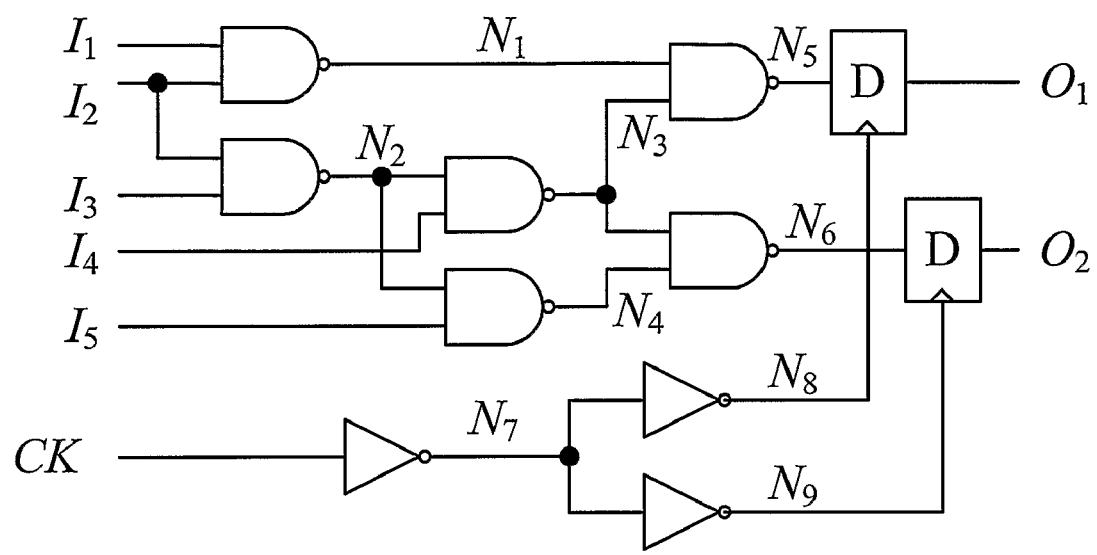
FIG. 6 depicts a circuit schematic of a simple digital circuit.

Shown in FIG. 6 is a simple digital circuit that consists of 9 gates and 2 D flip-flops. Such a simple example allows us to intuitively illustrate several key concepts of the proposed sensitivity analysis.

TABLE 1

Arc sensitivity values for the simple digital circuit
(only include the arcs with non-zero sensitivities)

| Arc | Proposed | MC | Arc | Proposed | MC |
|---|---|---|---|---|---|
| <$I_3, N_2$> | 100% | 100% | <$N_2, N_3$> | 99.9% | 99.9% |
| <$N_2, N_4$> | 0.1% | 0.1% | <$N_3, N_5$> | 70.8% | 72.4% |
| <$N_3, N_6$> | 29.1% | 27.5% | <$N_4, N_6$> | 0.1% | 0.1% |
| <CK, $N_7$> | 100% | 100% | <$N_7, N_8$> | 70.8% | 72.4% |
| <$N_7, N_9$> | 29.2% | 27.6% | | | |

Table 1 shows the arc sensitivity values computed by the proposed algorithm and Monte Carlo simulation with $10^4$ samples. The Monte Carlo simulation repeatedly draws random samples and counts the probability that an arc sits on the critical path following our definition. Note that the largest arc sensitivity error in Table 1 is only 1.6%. Such a high accuracy demonstrates that the Normal distribution assumption applied in our sensitivity analysis does not incur significant errors in this example.

As shown in Table 1, <$I_3, N_2$> is one of the arcs that have the largest sensitivity values. This is because <$I_3, N_2$> sits on three longest paths: {$I_3 \to N_2 \to N_3 \to N_5$}, {$I_3 \to N_2 \to N_3 \to N_6$} and {$I_3 \to N_2 \to N_4 \to N_6$}. Therefore delay of <$I_3, N_2$> can significantly change the maximal circuit delay through these three paths. Note that, although such a multiple-path effect cannot be easily identified by nominal timing analysis, it is successfully captured by the proposed sensitivity analysis.

In addition, it is also worth mentioning that the arc <$I_2, N_2$> in FIG. 6 has zero sensitivity, because the NAND gate is asymmetric and the arc delay $D(I_3, N_2)$ is larger than $D(I_2, N_2)$. Even with the process variations, $D(I_3, N_2)$ still dominates, since $D(I_2, N_2)$ and $D(I_3, N_2)$ are from the same gate and they are fully correlated.

5.2 ISCAS'85 Benchmark Circuits

Accuracy and Speed

TABLE 2

Sensitivity analysis error and cost
for ISCAS'85 benchmark circuits

| | Sensitivity Error | | | Computation Time (Sec.) | | |
| | | | | Proposed | | |
| CKT | Min | Avg | Max | Timing | Sensitivity | MC |
|---|---|---|---|---|---|---|
| c432 | 0.0% | 0.1% | 1.6% | 0.01 | 0.01 | 128 |
| c499 | 0.0% | 0.1% | 2.4% | 0.02 | 0.02 | 154 |
| c880 | 0.0% | 0.9% | 1.3% | 0.03 | 0.02 | 281 |
| c1355 | 0.4% | 0.9% | 2.5% | 0.05 | 0.03 | 359 |
| c1908 | 0.0% | 0.4% | 3.4% | 0.07 | 0.06 | 504 |
| c2670 | 0.0% | 0.3% | 2.6% | 0.09 | 0.05 | 771 |
| c3540 | 0.0% | 0.3% | 2.4% | 0.11 | 0.06 | 974 |
| c5315 | 0.8% | 1.8% | 2.8% | 0.17 | 0.11 | 1381 |
| c6288 | 0.0% | 0.6% | 1.9% | 0.25 | 0.11 | 1454 |
| c7552 | 0.7% | 1.1% | 3.5% | 0.26 | 0.14 | 1758 |

We performed statistical timing and sensitivity analysis for the ISCAS'85 benchmark circuits. Table 2 shows the minimal, average and maximal sensitivity errors of all timing arcs. These errors are compared against the Monte Carlo simulation with $10^4$ samples. Note that the maximal sensitivity error in Table 2 is less than 3.5% for all circuits and the proposed sensitivity analysis achieves about 4000× speedup over the Monte Carlo simulation. In addition, the sensitivity analysis time is slightly less than the timing analysis time, since the sensitivity analysis only involves simple matrix propagations while the timing analysis requires several $C_{eff}$ iterations in order to handle the interconnect delays.

Figure 7:
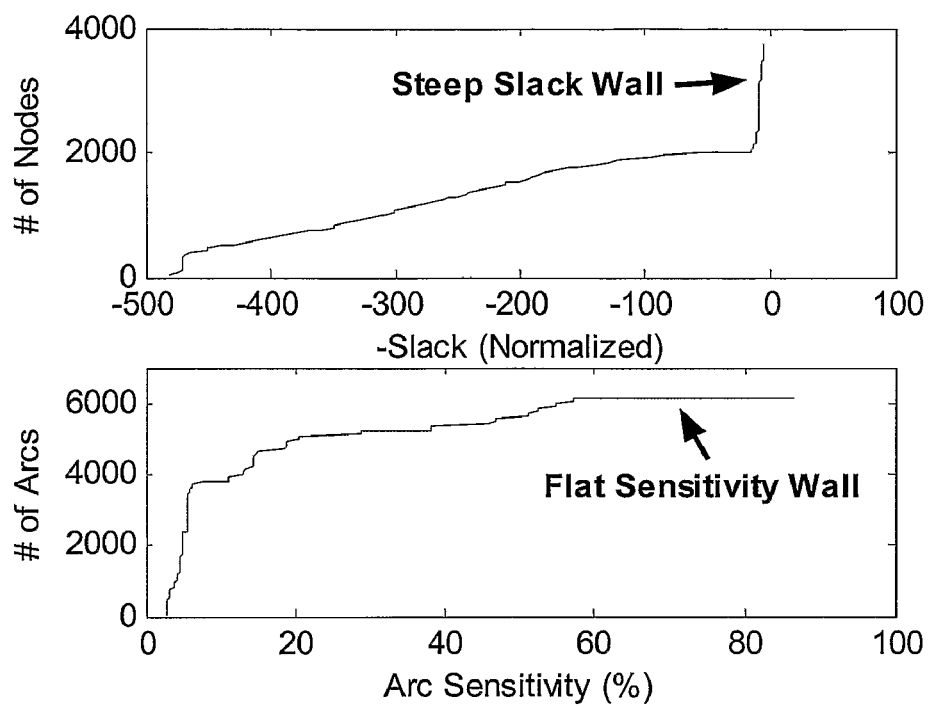
FIG. 7 depicts slack and sensitivity wall.

One important problem in nominal timing optimization is the steep slack wall discussed in Visweswariah ibid. Following nominal optimization, many paths have similar delays and become equally critical. In this example, we optimize the circuit C7552 based on its nominal delay and plot its nominal slacks in FIG. 7. (FIG. 7 is plotted for −Slack.) The steep slack wall in FIG. 7 implies that a great number of nodes have close-to-zero slacks and, therefore, are equally important in nominal timing optimization.

Next, we run the statistical sensitivity analysis for the same optimized circuit and plot the arc sensitivities in FIG. 7. Note that the sensitivity wall in FIG. 7 is flat. In other words, after the process variations are considered, only a small number of arcs dominate the overall timing performance. Although these arcs cannot be identified by nominal timing analysis, they are captured by the proposed statistical sensitivity analysis.

5.3 Scaling with Problem Size

TABLE 3

Sensitivity analysis cost for large industry examples

| Design | # of Cells | # of Pins | Computation Time (Sec.) | |
|---|---|---|---|---|
| | | | Timing | Sensitivity |
| A | $1.6 \times 10^4$ | $6.2 \times 10^4$ | 2.4 | 1.9 |
| B | $6.0 \times 10^4$ | $2.2 \times 10^5$ | 7.2 | 5.17 |
| C | $3.3 \times 10^5$ | $1.3 \times 10^6$ | 92.6 | 75.6 |

As a final example, we tested the proposed sensitivity analysis on three large industry examples. Table 3 shows the circuit sizes and computation cost for these examples. The Monte Carlo simulation is too expensive for these large examples and, therefore, is not computationally feasible here. As shown in Table 3, the computation cost of the proposed sensitivity analysis scales linearly as the circuit size increases (up to 1.3M pins).

Other examples will be apparent to persons skilled in the art. The scope of this invention should therefore not be determined solely by reference to the above description and tables therein, but instead should be determined inclusive of reference to the appended claims and figures, along with the full scope of equivalents to which such claims are entitled.

The invention claimed is:

1. A method for timing optimization of logic circuits, where a timing graph for said logic circuits exists, said method comprising:

defining a sensitivity matrix;

deriving sensitivity matrices for SUM and MAX operations; and applying SUM and MAX operations to propagate sensitivity matrices through the timing graph.

2. A method as in claim 1 wherein the propagation of sensitivity matrices comprises the steps of:

a) commencing the MAX operation at the sink node, D=MAX[AT(f)+D(f,sink), AT(g)+D(g,sink)] and compute the sensitivity matrices $Q_{D \leftarrow [AT(f)+D(f,sink)]}$ and $Q_{D \leftarrow [AT(g)+D(g,sink)]}$;

b) propagating $Q_{D \leftarrow [AT(f)+D(f,sink)]}$ to a first node f through the arc <f,sink>, determining $Q_{\leftarrow AT(f)}$ and $Q_{D \leftarrow D(f,sink)}$;

c) propagating $Q_{\leftarrow [AT(g)+D(g,sink)]}$ to a second node g through the arc <g,sink>, determining $Q_{D \leftarrow AT(g)}$ and $Q_{D \leftarrow D(g,sink)}$;

d) propagating $Q_{D \leftarrow AT(f)}$ and $Q_{D \leftarrow AT(g)}$ to a third node e, yielding $Q_{D \leftarrow D(e,f)} = Q_{D \leftarrow AT(f)}$, $Q_{D \leftarrow D(e,g)} = Q_{D \leftarrow AT(g)}$ and $Q_{D \leftarrow AT(e)} = Q_{D \leftarrow AT(f)} + Q_{D \leftarrow AT(g)}$; and e) continue propagating the sensitivity matrices until the source node is reached.

3. A method as in claim 2, wherein the step of computing the sensitivity matrices $Q_{D \leftarrow [AT(f)+D(f,sink)]}$ and $Q_{D \leftarrow [AT(g)+D(g,sink)]}$ uses the equations $$\partial z_0 / \partial x_0 = \Phi(\alpha)$$
$$\partial z_0 / \partial x_i = \partial z_i / \partial x_0 = \varphi(\alpha)(x_i - y_i)/\rho \quad (i = 1, 2, \ldots, M)$$
$$\partial z_i / \partial x_i = \Phi(\alpha) - \alpha\varphi(\alpha)(x_i - y_i)^2/\rho^2 \quad (i = 1, 2, \ldots, M)$$
$$\partial z_i / \partial x_j = -\alpha\varphi(\alpha)(x_i - y_i)(x_j - y_j)/\rho^2 \quad \begin{pmatrix} i, j = 1, 2, \ldots, M \\ i \neq j \end{pmatrix}$$

where $\rho$ and $\alpha$ are calculated using the equations $$\rho = \sqrt{\sum_{i=1}^{M}(x_i - y_i)^2} \quad \alpha = (x_0 - y_0)/\rho$$

and where the variables are defined as:

x, y, z: the statistical delay quantity at node f, g and sink;

$x_0$, $y_0$, $z_0$: the nominal value of the corresponding x, y and z;

$x_i$, $y_i$, $z_i$, $x_j$, $y_j$, $z_j$: the correlation between (x,y,z) and $i_{th}$ and $j_{th}$ physical variables;

φ(●): probability density function of standard Normal distribution;

Φ(●): cumulative distribution function of standard Normal distribution.

4. A method as in claim 3 wherein the logic circuits have been changed locally and the sensitivity analysis consists of one forward arrival time propagation from the source node to the sink node and one backward sensitivity propagation from the sink node to the source node.

5. A computer readable medium containing instructions operably sufficient to perform a method for timing optimization of logic circuits, said method comprising the steps of:

defining a sensitivity matrix;

deriving sensitivity matrices for SUM and MAX operations; and applying SUM and MAX operations to propagate sensitivity matrices through a timing graph of said logic circuits.

6. A computer readable medium as in claim 5, wherein the propagation of sensitivity matrices comprises the steps of:

a) commencing the MAX operation at the sink node, D=MAX[AT(f)+D(f,sink), AT(g)+D(g,sink)] and compute the sensitivity matrices $Q_{D \leftarrow [AT(f)+D(f,sink)]}$ and $Q_{D \leftarrow [AT(g)+D(g,sink)]}$;

b) propagating $Q_{D \leftarrow [AT(f)+D(f,sink)]}$ to a first node f through the arc <f,sink>, determining $Q_{D \leftarrow AT(f)}$ and $Q_{D \leftarrow D(f,sink)}$;

c) propagating $Q_{D \leftarrow [AT(g)+D(g,sink)]}$ to a second node g through the arc <g,sink>, determining $Q_{D \leftarrow AT(g)}$ and $Q_{D \leftarrow D(g,sink)}$;

d) propagating $Q_{D \leftarrow At(f)}$ and $Q_{D \leftarrow AT(g)}$ to a third node e, yielding $Q_{D \leftarrow D(e,f)} = Q_{D \leftarrow At(f)}$, $Q_{D \leftarrow D(e,g)} = Q_{D \leftarrow AT(g)}$ and $Q_{D \leftarrow AT(e)} = Q_{D \leftarrow AT(f)} + Q_{D \leftarrow AT(g)}$; and e) continue propagating the sensitivity matrices until the source node is reached, where the variables are defined as:

f, g: the name of the two nodes in a graph;

sink: the name of the output node where node f and g converge in the graph;

AT(i): the arrival time at the node i. For example, i can be node f and g;

Arc<i, j>: the edge that connect node i and j. For example, I can be node f and j can be node sink;

D(i, j): the delay from node i to j. For example, i can be node f and j can be node sink;

D: the arrival time at the sink node (i.e., the maximal circuit delay);

$Q_{j \leftarrow i}$: the sensitivity matrix between element j and element i. For example, j can be D and i can be AT(f).

7. A computer readable medium as in claim 6, wherein the step of computing the sensitivity matrices $Q_{D \leftarrow [AT(f)+D(f,sink)]}$ and $Q_{D \leftarrow [AT(g)+D(g,sink)]}$ uses the equations $$\partial z_0 / \partial x_0 = \Phi(\alpha)$$

$$\partial z_0 / \partial x_i = \partial z_i / \partial x_0 = \varphi(\alpha)(x_i - y_i)/\rho \quad (i = 1, 2, \ldots, M)$$

$$\partial z_i / \partial x_i = \Phi(\alpha) - \alpha \varphi(\alpha)(x_i - y_i)^2 / \rho^2 \quad (i = 1, 2, \ldots, M)$$

$$\partial z_i / \partial x_j = -\alpha \varphi(\alpha)(x_i - y_i)(x_j - y_j)/\rho^2 \quad \begin{pmatrix} i, j = 1, 2, \ldots, M \\ i \neq j \end{pmatrix}$$

where $\rho$ and $\alpha$ are calculated using the equations $$\rho = \sqrt{\sum_{i=1}^{M}(x_i - y_i)^2} \quad \alpha = (x_0 - y_0)/\rho$$

where the variables are defined as:

x, y, z: the statistical delay quantity at node f, g and sink;

$x_0, y_0, z_0$: the nominal value of the corresponding x, y and z;

$x_i, y_i, z_i, x_j, y_j, z_j$: the correlation between (x, y, z) and $i_{th}$ and $j_{th}$ physical variables;

$\phi(\bullet)$: probability density function of standard Normal distribution;

$\Phi(\bullet)$: cumulative distribution function of standard Normal distribution.

8. A computer readable medium as in claim 7 further including instructions operable to, in the case wherein the logic circuits have been changed locally, perform the sensitivity analysis consisting of one forward arrival timed propagation from the source node to the sink node and one backward sensitivity propagation from the sink node to the source node.

* * * * *